United States Patent [19]

Nelson et al.

[11] 3,820,379

[45] June 28, 1974

[54] APPARATUS FOR DETERMINING THE OXYGEN INDEX OF LIQUID AND NON-MOULDED SOLIDS

[75] Inventors: Gordon L. Nelson, Schenectady; Jimmy L. Webb, Ballston Lake, both of N.Y.

[73] Assignee: General Electric Company, Schenectady, N.Y.

[22] Filed: Nov. 20, 1972

[21] Appl. No.: 308,281

[52] U.S. Cl. ............................................. 73/15 R
[51] Int. Cl. .......................................... G01n 25/00
[58] Field of Search ................................. 73/15, 36

[56] References Cited
UNITED STATES PATENTS

| 3,011,337 | 12/1961 | McGlynn | 73/36 |
| 3,292,417 | 12/1966 | Hayden et al. | 73/15 |
| 3,593,563 | 7/1971 | Marmor et al. | 73/36 X |
| 3,662,586 | 5/1972 | Suga | 73/15 |

OTHER PUBLICATIONS

Wendlant "Thermal Methods of Analysis" Interscience Publishers 1964 QD515W4C.2 pg. 186–188.

Primary Examiner—Herbert Goldstein
Attorney, Agent, or Firm—Leo I. MaLossi; Joseph T. Cohen; Jerome C. Squillaro

[57] ABSTRACT

The utility of apparatus designed and operated for the determination of the oxygen index of a moulded polymer body has been greatly extended by making structural modifications to the prior art apparatus (introducing a removable sample receptacle) and by the invention of a new process for making the oxygen index determination on non-moulded materials, e.g. liquids, polymers or nonpolymers.

3 Claims, 3 Drawing Figures

APPARATUS FOR DETERMINING THE OXYGEN INDEX OF LIQUID AND NON-MOULDED SOLIDS

BACKGROUND OF THE INVENTION

The standard method of test for flammability of plastics using the Oxygen Index Method bears the ASTM designation: D2863–70 (Annual Book of ASTM Standards 1970 Part 27 — July, pages 719–722). This Oxygen Index Method is based upon work described in the paper "Candle-Type Test for Flammability of Polymers" by Fenimore and Martin (Modern Plastics, November, 1966, page 141). As is stated in the ASTM Standard "At least 10 specimens 70–150 mm long by 6.5 ± 0.5 mm wide and 3.0 ± 0.5 mm thick shall be cut from the materials being tested." It is also noted that, if other than standard size specimens are used, differences in oxygen index may occur. The ASTM Standard and the Modern Plastics article are incorporated by reference.

In an article by DiPietro and Stepniczka [Journal of Fire and Flammability 2, 36 (1971)], in order to accommodate plastic specimens that are not physically self-supporting, specimens of the size 0.3 × 2.5 × 2.5 cm$^3$ were used and mounted in a sqaure cup-shaped holder with inner dimensions identical to those of the specimens.

Thus, according to the prior art, oxygen index determinations can be reliably made for polymers only when the polymers can be (and have been) fabricated in order that samples can be cut from a solid moulded piece.

It would be of particular value to the art to be able to determine the oxygen index not only of polymers, but also of non-polymeric systems and that there be no limitations as to the amount or volume of material that may be used in making such a determination thereby eliminating the limitations that the material be capable of fabrication and that sufficient of the material will have been prepared to enable fabrication.

Although Wolfhard and co-workers have reported [*Combustion and Flame*, 1, 53, 155 (1957)] studies of the flammabilities of gaseous and volatile liquid fuels using oxygen indices, workers in this field do not appear to have developed an apparatus or method for the determination of the oxygen index of other than moulded polymer samples or highly volatile fuels. Thus, there is a need for apparatus and process enabling the measurement of oxygen indices of liquids, non-polymer solids and polymer samples available in small (unmoulded) quantities as powders or pellets.

SUMMARY OF THE INVENTION

Commercial apparatus for the determination of oxygen index has been modified by replacing the moulded polymer sample clamp with a metal support and a readily removable reservoir for containment of the sample. In the process of this invention there is no limitation as to the amount or volume of the sample required, it merely being necessary to ignite the quantity of sample that is convenient at an oxygen index higher than needed to support combustion and then reduce the oxygen flow until the flame oscillates badly. The lowest oxygen index needed to maintain the flame in this oscillating condition is recorded as the endpoint.

BRIEF DESCRIPTION OF THE DRAWING

The exact nature of this invention as well as objects and advantages thereof will be readily apparent from consideration of the following specification relating to the annexed drawing in which.

DESCRIPTION OF THE PREFERRED EMBODIMENT

Figure 1:
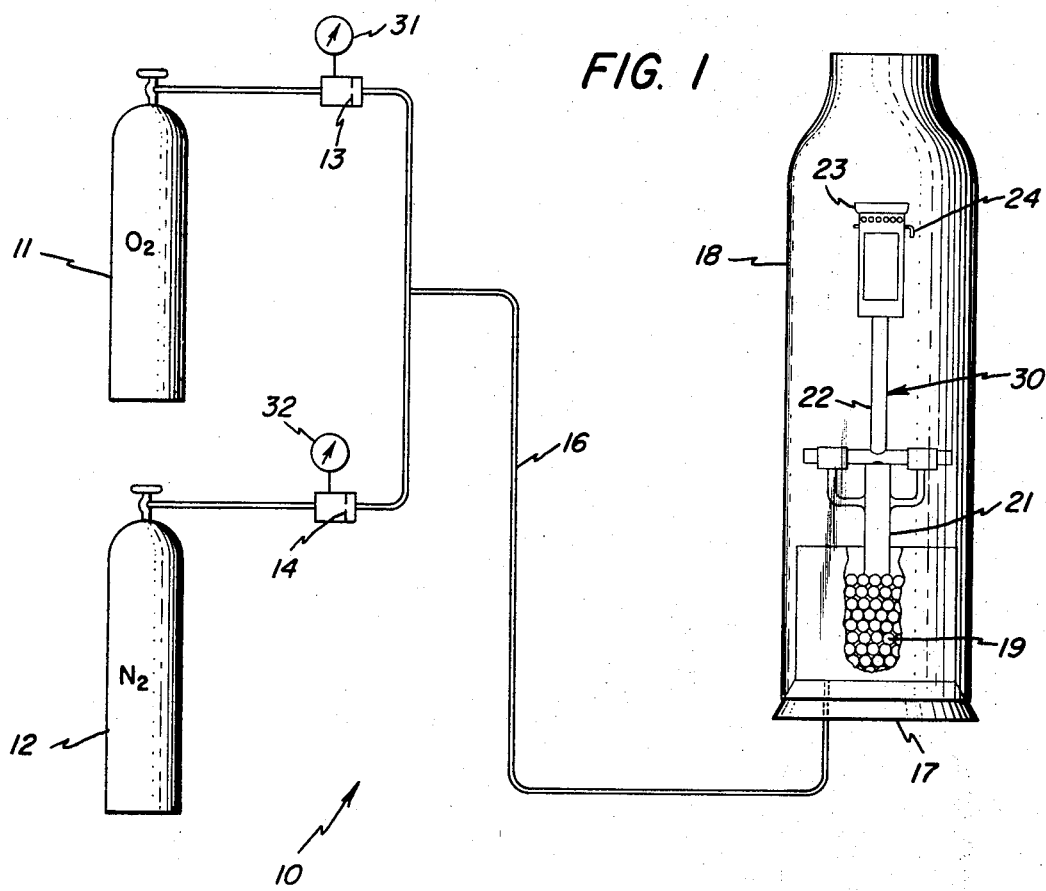
FIG. 1 is a schematic representation of apparatus for the determination of oxygen index according to the aforementioned ASTM Standard as modified for the conduct of the process described herein.
Figure 2:
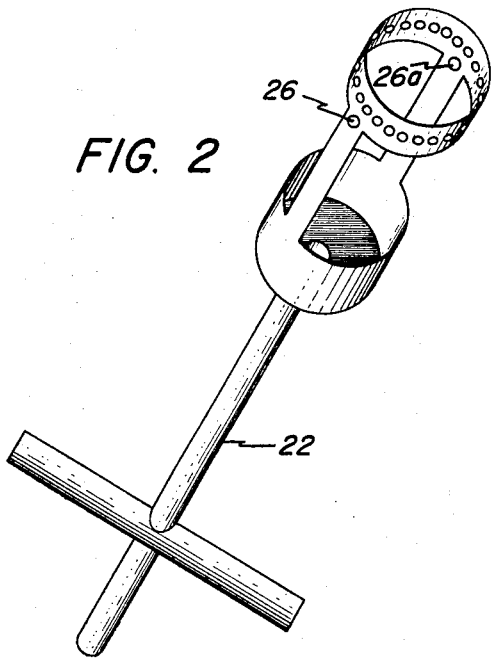
FIG. 2 is a three-dimensional view of an embodiment of support means for the removable receptacle shown in FIG. 3

The apparatus 10 for making oxygen index determinations as modified in accordance with this invention is shown in FIG. 1. The sample to be tested is provided with a known atmosphere prepared by metering oxygen (from tank 11) and nitrogen (from tank 12) through critical flow orifices 13, 14, respectively, mixing the gases in tube 16 before entry thereof into base 17 for supporting test column 18 made of heat-resistant glass. Commercial grade (or better) oxygen and nitrogen should be used. Base 17 contains non-combustible material to mix and evenly distribute the gas mixture fed thereto. Glass beads 3—5 mm in diameter in a bed 80–100 mm deep have been found suitable. As the mixed gas is passed through bed 19, the flow of gases is smoothed providing laminar flow up through test column 18 at a free stream velocity in the range of from about 3 to about 10 cm/sec.

Figure 3:
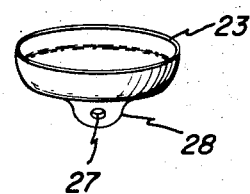
FIG. 3 is a three-dimensional view of a simple receptacle to be employed in connection with and supported on the support shown in FIG. 2.

Device 20 for accommodating the sample and the containment therefor is seated in receptacle 21 and consists of holder 22 and reservoir 23 resting thereon. The use of metal pin 24 for affixing reservoir 23 to the upper rim or collar of holder 22 is optional. If used, pin 24 is passed through holes 26, 26a in holder 22 as well as through hole 27 in projecting portion 28 of reservoir 23. A convenient reservoir may be obtained by employing a size A ceramic crucible cover, which has the configuration shown in FIG. 3. Metal support 22 need have no specific configuration other than to be adapted at its lower end for support thereof and adapted at its upper end for receiving the particular removable receptacle employed holding it about the periphery to expose the underside thereof in the event it be necessary to apply heat to the receptacle to melt the specimen contained therein.

None of the following: sample size, geometry of the reservoir or sample or depth of sample contained in the receptacle 23 was found to have significant effect on the accuracy of the results. For example, use of a crucible or of a crucible cover gave similar results. Also, total flow of the gas mixture through the test column had no appreciable effect on the results.

Conduct of the test itself consists of introducing a quantity of sample (liquid or particulate solid) into reservoir 23, supporting loaded reservoir 23 on the collar-shaped extremity of support 22, establishing the requisite gas flow to purge the system, setting the gas flow at an oxygen index higher than is presumably needed for the sample, igniting the sample and gradually reducing the oxygen flow until the flame oscillates badly. The lowest oxygen index needed to maintain the flame in this oscillating condition is recorded as the endpoint.

The igniter (not shown) should be a tube connected to a hydrogen, propane or natural gas source. The tube is inserted into the open end of the column to ignite the test specimen (or to melt the test specimen prior to ignition) utilizing a suitable flame e.g. from about 6 to 12 mm long.

A ceramic crucible cover (about 1 inch in diameter) was utilized for making the oxygen index determinations set forth in Table 1. In each instance the sample was placed in the reservoir brim full.

TABLE 1

| Compound | Oxygen Index |
| --- | --- |
| Hexadecane | 15.5 |
| Borneol | 15.5 |
| Acetone | 16 |
| Acetophenone | 16.5 |
| Triphenylphosphine | 20.4 |
| Phenyltrifluoroacetate | 17.4 |
| 4,4'-dichlorodiphenylsulfone | 20 |
| Pyranol - 1499 | 35 |
| Bromobenzene | 23.6 |
| Phenol | 17.0 |
| Pyridine | 16.4 |
| Steric Acid | 16.5 |
| Sucrose | 22.0 |
| Delrin | 14.4 |
| Polystyrene | 17 |
| Polyvinyl Alcohol | 18.8 |
| Nylon | 23.7 |
| Sorbitol | 17.4 |
| Benzene | 15.6 |
| Diphenylether | 16.3 |
| Thiophene | 16.5 |
| Benzamide | 17.4 |
| Thioanisole | 15.5 |
| Triethylborate | 16.6 |
| Hexamethyldisiloxane | 15.0 |

Thus, the improved apparatus and the new method conducted therein greatly extends the utility of oxygen index as a technique for the determination of material flammability by permitting the ready determination of the oxygen index of liquids of normal and low volatility and particulate solids (both polymeric and non-polymeric). Stringent limitations in the existing ASTM method have been removed; thus, there is no limitation as to the amount or volume of specimen to be employed nor is there any need that the specimen shall have been fabricated in order to permit the preparation of requisite dimensioned samples. Also, the method itself is considerably simpler than that described in the ASTM Standard because turning down the oxygen until the state of flame oscillation is reached as the end condition is considerably simpler than monitoring the burning of a specimen until that specimen burns a 50 mm length in a period of 3 minutes.

Determination of the actual oxygen index from the pressure readings on the precision gas gauges 31, 32 is straightforward. A graph is available plotting pressure as a function of gas flow for the particular orifices employed. When the oxygen flow has been reduced to the endpoint, the pressure reading for oxygen and nitrogen are used and reference is made to the graph to acquire the actual gas flows. The relationships for determining oxygen index are as follows:

OXYGEN INDEX = $[O_2]/[O_2] + [N_2] \times 100$ where $[O_2]$ and $[N_2]$ are oxygen and nitrogen gas flows, respectively.

In those instances in which it is found that the maximum oxygen input at a given nitrogen setting is not enough to exceed the oxygen index of the material, it is merely necessary to cut back on the nitrogen flow and then proceed in the normal manner. Also, if desired, instead of turning down the oxygen flow, the nitrogen flow can be turned up.

What we claim as new and desire to secure by letters Patent of the United States is:

1. In flammability testing apparatus in which oxygen index determinations are made wherein a test column made of transparent heat-resistant material is supported on a base, said column is in flow communication with means passing through said base for introducing gaseous material, said gaseous material passing through said column after traversing flow distribution means disposed in the path of flow, means for disposing in said column a sample to be ignited, said sample-disposing means being supported by said base, a source of a first gas under pressure in flow communication with said introducing means via first flow measuring and controlling means and a source of a second gas under pressure in flow communication with said introducing means via second flow measuring and controlling means, the improvement in the combination recited above of sample-disposing means comprising a receptacle for containing sample material and means for supporting said receptacle, said supporting means being formed in part with an annular portion for holding said receptacle with the underside thereof exposed, said receptacle being readily separable from said supporting means.

2. The improvement recited in claim 1 wherein the receptacle is a ceramic cup.

3. The improvement recited in claim 1 wherein the receptacle is connected to the supporting means therefor by a removable connector.

* * * * *